US010269340B2

(12) United States Patent
Yen (10) Patent No.: US 10,269,340 B2
(45) Date of Patent: Apr. 23, 2019

(54) ULTRASOUND BEAMFORMER WITH INDIVIDUAL ARRAY ELEMENT MULTIPLEXERS

(71) Applicant: UNIVERSITY OF SOUTHERN CALIFORNIA, Los Angeles, CA (US)

(72) Inventor: Jesse Yen, La Crescenta, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 721 days.

(21) Appl. No.: 14/408,250

(22) PCT Filed: Jun. 14, 2013

(86) PCT No.: PCT/US2013/045972
§ 371 (c)(1),
(2) Date: Dec. 15, 2014

(87) PCT Pub. No.: WO2013/188817
PCT Pub. Date: Dec. 19, 2013

(65) Prior Publication Data
US 2015/0138925 A1    May 21, 2015

Related U.S. Application Data

(60) Provisional application No. 61/660,527, filed on Jun. 15, 2012.

(51) Int. Cl.
*H04B 1/02* (2006.01)
*G10K 11/34* (2006.01)
(Continued)

(52) U.S. Cl.
CPC ............ *G10K 11/34* (2013.01); *G01S 7/5202* (2013.01); *G01S 15/8915* (2013.01); *G10K 11/346* (2013.01)

(58) Field of Classification Search
USPC ........................................................ 367/138
See application file for complete search history.

(56) References Cited

U.S. PATENT DOCUMENTS 3,557,793 A * 1/1971 Ediny .............. A61B 17/22012
606/128
3,656,012 A * 4/1972 Dixon ................. G10K 15/043
310/317

(Continued)

FOREIGN PATENT DOCUMENTS

WO    WO 2013/188817 A1    12/2013

OTHER PUBLICATIONS

Nguyen, Man Minh, Jay Mung, and Jesse T. Yen. "Fresnel-based beamforming for low-cost portable ultrasound." IEEE transactions on ultrasonics, ferroelectrics, and frequency control 58.1 (2011).*

(Continued)

*Primary Examiner* — Isam A Alsomiri
*Assistant Examiner* — Jonathan D Armstrong
(74) *Attorney, Agent, or Firm* — McDermott Will & Emery LLP (57) ABSTRACT

An ultrasound beamformer may include an array of ultrasound transducer elements. Multiple signal transmitters may each generate an ultrasound signal that is different from the ultrasound signal generated by each of the others. The number of ultrasound transmitters may be no more than half the number of ultrasound transducer elements. Each multiplexer may have multiple signal inputs, each connected to a different one of the ultrasound signals; an output that drives the ultrasound transducer element; and a control input that controls which of the ultrasound signals at the signal inputs to the multiplexer is delivered to the output of the multiplexer based on a control signal. The controller may generate the control signals with a collective configuration that causes the array of ultrasound transducer elements to steer (Continued)

an/or focus a beam of ultrasound energy in one or more different ways at one or more different times.

20 Claims, 3 Drawing Sheets

(51) Int. Cl.
    *G01S 7/52*       (2006.01)
    *G01S 15/89*     (2006.01)

(56) References Cited

U.S. PATENT DOCUMENTS

| | | | | |
|---|---|---|---|---|
| 3,723,955 A * | 3/1973 | Lyons | G10K 11/346 | 342/372 |
| 3,735,764 A * | 5/1973 | Balev | A61B 17/22022 | 601/4 |
| 3,990,300 A * | 11/1976 | Kossoff | A61B 8/0825 | 73/640 |
| 4,070,642 A * | 1/1978 | Iinuma | G01S 7/5206 | 367/105 |
| 4,159,462 A * | 6/1979 | Rocha | G01S 7/52026 | 367/105 |
| 4,180,792 A * | 12/1979 | Lederman | B06B 1/0622 | 342/380 |
| 4,336,607 A * | 6/1982 | Hill | G10K 11/345 | 367/123 |
| 4,381,501 A * | 4/1983 | Pajer | G06F 3/023 | 178/17 C |
| 4,567,769 A * | 2/1986 | Barkhoudarian | G01H 9/006 | 374/5 |
| 5,532,700 A * | 7/1996 | Lockwood | G01S 7/52003 | 342/378 |
| 5,642,329 A * | 6/1997 | Zehner | G01S 7/52003 | 367/105 |
| 6,128,958 A | 10/2000 | Cain | | |
| 6,641,534 B2 * | 11/2003 | Smith | A61B 8/145 | 600/437 |
| 7,372,775 B2 * | 5/2008 | Hayashi | B06B 1/0238 | 367/137 |
| 8,254,654 B2 * | 8/2012 | Yen | G01S 7/52047 | 382/128 |
| 8,523,774 B2 * | 9/2013 | Yen | G10K 11/341 | 600/437 |
| 8,551,000 B2 * | 10/2013 | Chiang | A61B 8/4483 | 600/446 |
| 10,080,544 B2 * | 9/2018 | Chiang | A61B 8/4488 | |
| 2003/0018260 A1 | 1/2003 | Erikson | | |
| 2004/0002656 A1 | 1/2004 | Sheljaskow et al. | | |
| 2004/0267135 A1 | 12/2004 | Takeuchi | | |
| 2009/0036772 A1 | 2/2009 | Lu | | |

OTHER PUBLICATIONS

Nguyen, Man. Fresnel beamforming for low-cost, portable ultrasound systems. University of Southern California, 2013. (Year: 2013).*

Korean Intellectual Property Office (ISA/KR). 2013. International Search Report and Written Opinion, dated Sep. 16, 2013, for PCT Application PCT/US2013/045972, filed Jun. 14, 2013.

* cited by examiner

ULTRASOUND BEAMFORMER WITH INDIVIDUAL ARRAY ELEMENT MULTIPLEXERS

CROSS-REFERENCE TO RELATED APPLICATION

This application is a United States national phase filing of PCT Application PCT/US2013/045972, filed Jun. 13, 2013, entitled "Ultrasound Beamformer with Individual Array Element Multiplexers," which is based upon and claims priority to U.S. provisional patent application 61/660,527, entitled "NOVEL TRANSMIT BEAMFORMER," filed Jun. 15, 2012. The entire content of each of these applications is incorporated herein by reference.

STATEMENT REGARDING FEDERALLY SPONSORED RESEARCH

This invention was made with government support under Grant No. R01CA116379-01A1, awarded by the National Institutes for Health. The government has certain rights in the invention.

BACKGROUND

Technical Field

This disclosure relates to ultrasound beamformers that deliver different ultrasound signals to elements of an array of ultrasound transducer elements.

Description of Related Art

An ultrasound beamformer may require an array having a large number of ultrasound transducer elements, such as between 16-256 elements. Each element in the array may need to be driven by a different ultrasound signal in order to cause the combination of ultrasound energy that is generated by all of the ultrasound transducer elements to form a steerable and/or focused beam of ultrasound energy. Connection between a probe that contains the array of ultrasound transducer elements and a base unit containing ultrasound transmitters that generate the ultrasound signals may require cabling containing 16-256 separate wires. Each ultrasound signal transmitter, in turn, may require control logic, a level shifter, MOSFET drivers, decoupling capacitors, trimming resistors, and/or other hardware.

These intensive hardware demands and cabling complexities can increase costs, power requirements, and bulk.

SUMMARY

An ultrasound beamformer may include an array of ultrasound transducer elements, multiple ultrasound signal transmitters, a multiplexer for each ultrasound transducer element, and a controller. Each signal transmitter may generate an ultrasound signal that is different from the ultrasound signal generated by each of the other ultrasound signal transmitters. The number of ultrasound transmitters may be no more than half the number of ultrasound transducer elements. Each multiplexer may have multiple signal inputs, each connected to a different one of the ultrasound signals, an output that drives the ultrasound transducer element, and a control input that controls which of the ultrasound signals at the signal inputs to the multiplexer is delivered to the output of the multiplexer based on a control signal. The controller may generate the control signals with a collective configuration that causes the array of ultrasound transducer elements to steer and/or focus a beam of ultrasound energy in one or more different ways at one or more different times.

The number of signal inputs to each of the multiplexers may be equal to or less than the number of ultrasound signal transmitters.

The controller may cause at least two of the multiplexers to drive their respective ultrasound transducer element with the same ultrasound signal.

The array of ultrasound transducer elements may be one or two dimensional.

The same multiplexer may be used to drive two or more neighboring transducer elements in a two dimensional array.

The frequency of the ultrasound signals may be the same, but the phases may be different. The phase differences may be equally distributed over one cycle of the ultrasound signal.

There may be an optimum time delay for each ultrasound signal that is delivered to each ultrasound transducer element that causes the array of ultrasound transducer elements to collectively steer and/or focus a beam of ultrasound energy most effectively; and the controller may generate each control signal so as to cause the multiplexer that receives the control signal to select the ultrasound signal that has a time delay that is closest to the optimum time delay for the ultrasound signal that is delivered by the output of the multiplexer.

The controller may generate each control signal in accordance with the following equation:

$$n=[N \bmod(t,T)/T]$$

where n is the number of the ultrasound signal that the control signal causes its associated multiplexer to select; N is the number of inputs to the multiplexer that receives the control signal; t is the optimum time delay for the ultrasound signal for the ultrasound transducer element that is driven by the multiplexer; T is the period of the ultrasound signal; [ ] indicate a rounding to the nearest integer; and mod indicates a modulo operation.

The number of ultrasound transducer elements may be at least 16, and the number of signal inputs to each of the multiplexers may be in the range of 4 to 8.

At least one of the multiplexers may not deliver any signal to its output when the control signal at its control input is of a particular type. The controller may cause the control signal for that multiplexer to be of the particular type when causing the array of ultrasound transducer elements to steer or focus a beam of ultrasound energy in a particular way.

The controller may cause the control signal for each multiplexer to cause that multiplexer to deliver at least one of the ultrasound signals to its output when causing the array of ultrasound transducer elements to steer or focus a beam of ultrasound energy in a particular way.

The controller may cause each multiplexer to deliver one of the ultrasound signals to its output for only a predetermined duration.

The ultrasound signals may be square waves, sine waves, triangular waves, or another form of periodic signal.

The controller may control the commencement and cessation of each output of each multiplexer and in a manner that is not the same for each multiplexer.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
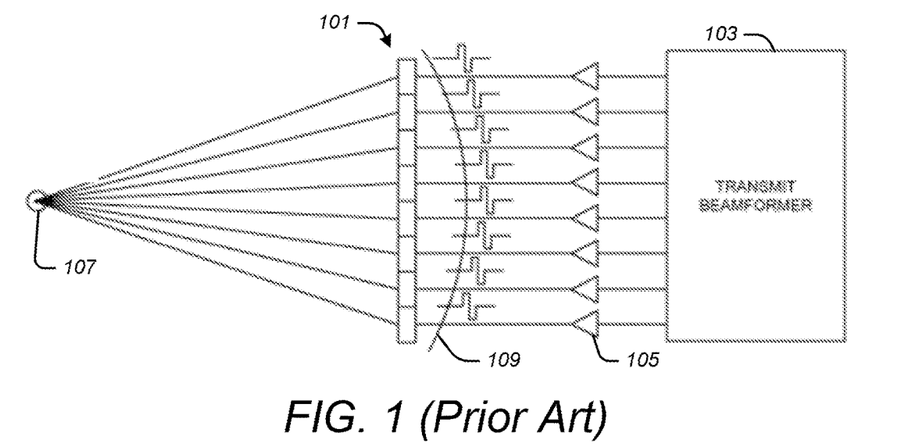
FIG. 1 illustrates an example of a prior art ultrasound beamformer.

FIG. 1 illustrates an example of a prior art ultrasound beamformer. As illustrated in FIG. 1, the ultrasound beamformer may include an array of ultrasound transducer elements 101, a transmit beamformer 103, and a high-voltage ultrasound signal transmitter for each ultrasound transducer element, such as the high-voltage ultrasound signal transmitter 105.

The array of ultrasound transducer elements 101 may be of any type. In FIG. 1, a linear one-dimensional array of eight elements is illustrated. However, this is merely for illustration. The array may have a different configuration. For example, the array may be a two dimensional array of elements. The array may also have a different number of elements, such as a much larger number of elements, such as between 16 and 256 elements.

The transmit beamformer 103 may be configured to generate multiple ultrasound signals, each different from the other ultrasound signals. The ultrasound signals may be of any type. For example, the ultrasound signals may be square waves, sine waves, triangle waves, or another type of periodic or aperiodic signal. The ultrasound signals may all be at the same frequency, but with different phases.

There is one ultrasound signal for each element in the array 101. Thus, for example, there are 64 different ultrasound signals if there are 64 elements in the array, and 256 different ultrasound signals if there are 256 elements in the array. (In some systems, there may be a smaller number of different ultrasound signals than elements.)

An ultrasound signal transmitter may generate each ultrasound signal and may include the transmit beamformer 103 and a high-voltage transmitter for each ultrasound signal that is generated by the transmit beamformer 103, an example of which is high-voltage transmitter 105. Each high-voltage transmitter may include level shifters, high-voltage transistors which may be driven on and off to produce high voltage square-wave pulses based on a signal from the transmit beamformer 103, and/or other electronic components. A high voltage amplifier may be used in instead, and when so used is considered part of the ultrasound signal transmitter.

The timing of the ultrasound signals is such that the collective signals emitted by the array of ultrasound elements 101 produce a steered and/or focused beam of ultrasound energy. In the example illustrated in FIG. 1, the ultrasound signals emitted from the array of ultrasound transducer elements 101 all arrive at a transmit focal point 107 simultaneously. This signal timing needed to accomplish this result may be calculated based on the distance between each ultrasound element of the array 101 and the focal point 107, and the speed at which ultrasound travels. A profile 109 illustrates an example of needed signal delays to generate this focused beam.

Figure 2:
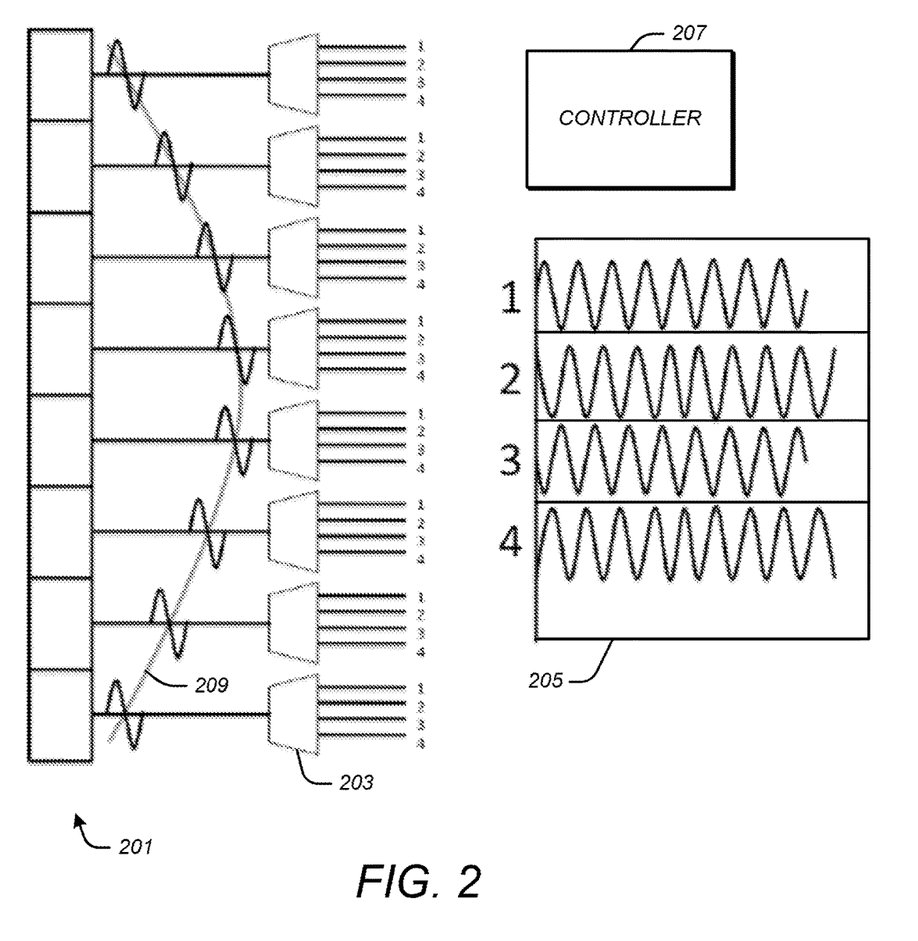
FIG. 2 illustrates an example of a portion of an ultrasound beamformer that utilizes a multiplexer for each ultrasound transducer element, radically reducing the number of ultrasound signal transmitters that may be needed.

FIG. 2 illustrates an example of a portion of an ultrasound beamformer that utilizes a multiplexer for each ultrasound transducer element, radically reducing the number of ultrasound signal transmitters that may be needed. As illustrated in FIG. 2, the portion of the beamformer may include an array of ultrasound transducer elements 201, a multiplexer for each ultrasound transducer element, such as a multiplexer 203, multiple ultrasound signal transmitters 205 (illustrated merely by the sine wave signals that they generate), and a controller 207.

The array of ultrasound transducer elements 201 may be of any type, including any of the types discussed above in connection with the array of ultrasound transducer elements 101.

Each of the ultrasound signal transmitters 205 may similarly be of any type, including any of the types discussed above in connection with the transmit beamformer 103 and its associated high-voltage ultrasound signal transmitters and transmit beamformer 103. For example, the ultrasound signals generated by the ultrasound signal transmitters 205 may all be sine waves having the same frequency, but a different phase from the others.

Substantially unlike the ultrasound beamformer illustrated in FIG. 1 and discussed above, however, the number of ultrasound transmitters may be substantially less than the number of ultrasound transducer elements. For example, there may be only 4, 5, 6, 7, or 8 ultrasound transmitters, each producing a different ultrasound signal, even though there may be a much larger number of ultrasound transducer elements in the array 201, such as between 16 and 256 ultrasound transducer elements.

Also substantially unlike the ultrasound beamformer illustrated in FIG. 1 and discussed above, the phase differences between the various ultrasound signals, when of the same frequency, may be evenly distributed over a single cycle of the ultrasound signal. For example, if there are only four ultrasound signals, their relative phases may be at 0°, 90°, 180°, and 270°.

Each multiplexer may have multiple inputs, such as the inputs 1, 2, 3, and 4 illustrated in FIG. 2. Each input may be connected to a different one of the ultrasound signals from one of the ultrasound transmitters. The number of inputs to each multiplexer may be the same as the number of ultrasound signals or less. Those inputs of the multiplexers that are connected to the same ultrasound signal may be tied together, thereby requiring only a single connection from the set of multiplexers (which may be part of a probe that also contains the array of ultrasound transducer elements) to the ultrasound signal transmitter that is generating that signal (which may be in a separate base unit).

Each multiplexer may have a single output which drives one of the ultrasound transducer elements. In some configurations, a single multiplexer may be used to drive multiple transducer elements, such as neighboring transducer elements in a two dimensional array of transducer elements.

Each multiplexer may have a control input that controls which of the ultrasound signals at the signal inputs to the multiplexer is delivered to the output of the multiplexer based on a control signal. The control input to one or more of the multiplexers may also control when any signal is delivered to their output, thereby enabling the output from the multiplexers to be disabled. Conversely, one or more of the multiplexers may always output a selected one of the ultrasound signals that are delivered to their signal inputs.

The controller 207 may be configured to generate the control signals that are delivered to the control inputs of the multiplexers. The controller 207 may be configured to generate the control signals so as to cause each multiplexer to select the ultrasound signal at its signal input that will collectively cause the array of ultrasound transducer elements 201 to steer and/or focus a beam of ultrasound energy in a particular way, such as to focus the beam at a particular focal point (not shown in FIG. 2). The controller 207 may be configured to generate multiple different sets of control signals so as to cause each multiplexer to select different ultrasound signals at different times, thereby enabling the controller 207 to steer and/or focus a beam of ultrasound energy in different ways at different times.

There may be an optimum time delay for each ultrasound signal that is delivered to each ultrasound transducer element that causes the array of ultrasound transducer elements 201 to collectively steer and/or focus a beam of ultrasound energy most effectively. The controller 207 may have a configuration that generates each control signal so as to cause the multiplexer that receives the control signal to select the ultrasound signal that has a delay that is closest to the optimum time delay for the ultrasound transducer element that is driven by the output of the multiplexer. For example, the controller may generate each control signal in accordance with the following equation:

$$n = [N \bmod(t,T)/T]$$

where n is the number of the ultrasound signal that the control signal causes its associated multiplexer to select, N is the number of inputs to the multiplexer that receives the control signal, t is the optimum time delay for the ultrasound signal for the ultrasound transducer element that is driven by the multiplexer, T is the period of the ultrasound signal, [ ] indicate a rounding to the nearest integer, and mod indicates a modulo operation. As an example, if the optimum time delay for a particular ultrasound transducer element is 335 ns with an ultrasound period of 200 ns and N=4, then n=3. The control input on the multiplexer for this signal may then be set by the controller 207 to cause the third ultrasound signal to be outputted.

The controller 207 may have a configuration that causes each multiplexer to deliver one of the ultrasound signals to its output only during a pre-determined time period, which may be different for each multiplexer. This may enable the controller 207 to control both the selection of ultrasound signals and their respective time windows of delivery. The initiation and length of each pre-determined time period may be selected by the controller 207 to cause the array of ultrasound transducer elements to steer and/or focus a beam of ultrasound energy in a particular way, such as to arrive simultaneously at a particular focal point. A profile 209 illustrates an example of different initiation times for the array of ultrasound transducer elements.

The controller 207 may include a memory configured to hold data representative of different values for the control inputs to the multiplexers that are needed to cause the multiplexers to which these control signals are delivered to select and optionally gate the ultrasound signals so as to cause the array of ultrasound elements to steer and/or focus a beam of ultrasound energy in one or more particular ways. The controller 207 may in addition or instead be programmed with one or more algorithms that compute these needed selections and/or gating periods. The controller 207 may be implemented with digital control circuitry configured to provide the functions described herein. The controller 207 include one or more processors and associated hardware devices. The controller 207 may also include a program of computer instructions configured to cause the controller to implement one or more of the functions described herein. This program of instructions may be stored on a non-transitory, tangible, computer-readable storage medium.

Figure 3A:
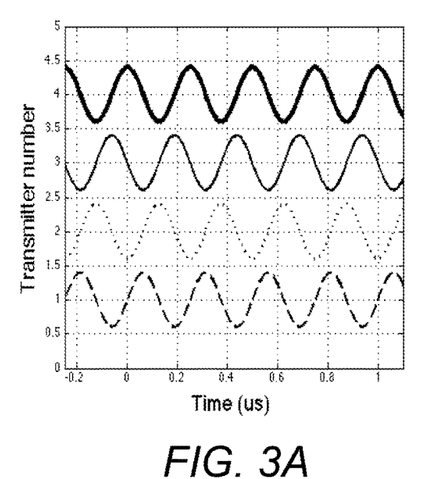
FIG. 3A-3D illustrate examples of various waveforms that may relate to the ultrasound beamformer illustrated in FIG. 2.
Figure 3B:
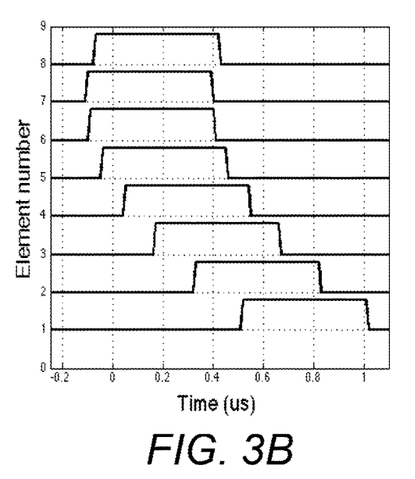
Figure 3C:
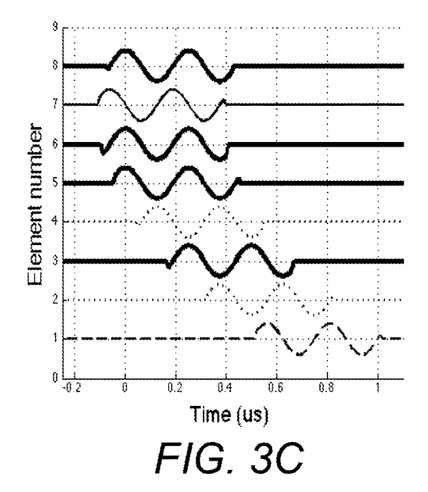
Figure 3D:
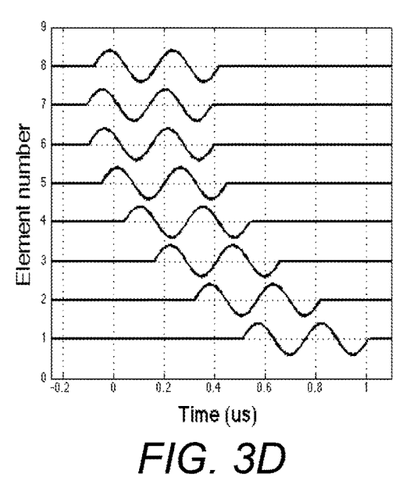

FIGS. 3A-3D illustrate examples of various waveforms that may relate to the ultrasound beamformer illustrated in FIG. 2. FIG. 3A illustrates an example of ultrasound signals that may be generated by ultrasound signal transmitters and inputted to signal inputs to multiplexers, FIG. 3B illustrates an example of multiplexer gating signals that may be generated by a controller and applied to the multiplexers so as to cause the output of each multiplexer to reflect a selected one of the inputted ultrasound signals (high means closed; low means open). FIG. 3C illustrates an example of ultrasound signals that may be delivered to the ultrasound transducer elements by the ultrasound beamformer partially illustrated in FIG. 2 to cause the array to steer and/or focus a beam of ultrasound energy in a particular way. FIG. 3D illustrates an example of theoretical optimum pulses that may be needed for the array to steer and/or focus a beam of ultrasound energy in this particular way.

The approaches illustrates in FIGS. 2 and 3 and discussed above may reduce the number of transmit channels from between 16-256 to between 4-8, thus substantially reducing the amount of needed hardware and the number of wires between a probe (that may contain the transducer elements adjacent to the multiplexers) and a base unit (that may contain the ultrasound signal transmitters).

Each of the ultrasound transmitters may transmit a multi-cycle burst which may be several microseconds in duration. The duration may be roughly equal to the range of delays desired. For example, if the array of transducers has an operating frequency of 5 MHz, and if the maximum range of delays is 20 us, then a 100-cycle burst may be transmitted. However, most transmit signals may be 1-8 cycles in length to achieve good axial resolution. To achieve a shorter, more desirable pulse duration, each multiplexer or an additional single-pole/single-throw electronic switch may be closed only for the desired duration, such as for 1-8 cycles. In essence, each multiplexer or SPST may be used as a gate to emit the correct pulse with a desired duration at the correct time.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently. For example, an additional set of demultiplexers may be interposed between the ultrasound array and the multiplexers described above. For example, a linear array may have 256 elements, while only 64-128 of these elements are excited. Demultiplexers may be placed between the array and transmitters such that any adjacent set of 64-128 elements are chosen at a particular time. With this approach, 64-128 transmitters may be needed. The beamforming approach that has been discussed herein may be combined with these demultiplexers, requiring even fewer transmit channels. If 64 elements were used at any given time out of a 256 element array along with a 4-phase transmit system, the system described herein may then only need 64 4:1 demultiplexers and 64 4:1 multiplexers. This scheme would still allow for use of any adjacent group of 64 elements out of a 256 element array. Steering and/or focusing with the 64 elements can be achieved in this manner. To accommodate this variation, the phase "array of ultrasound elements," as used herein, means both all of the ultrasound elements in a single physical array, as well as just a subset of these ultrasound elements.

A modular version of the beamformer is another variation. In the modular version, each element may still have its own multiplexer. However, different clusters of elements/multiplexers may have different sets of signal transmitters. This may be advantageous to minimize unwanted electrical loading effects.

Different elements may receive different gate durations simultaneously. For example, the gate for element 1 may be closed for 3 cycles while the gate for element 2 may be closed for 7 cycles. This may be advantageous for achieving a desired beam shape. A non-integer number of cycles is also possible.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. An ultrasound beamformer comprising:
   a first plurality of ultrasound transducer elements configured in an array;
   a second plurality of ultrasound signal transmitters, each having a configuration that generates an ultrasound signal that is different from an ultrasound signal generated by each of the other ultrasound signal transmitters, wherein the second plurality is no more than half the first plurality;
   each ultrasound transducer element connected, respectively, to a multiplexer having:
   multiple signal inputs, each connected to a different one of the ultrasound signals;
   an output that drives the ultrasound transducer element; and
   a control input that controls which of the ultrasound signals at the signal inputs to the multiplexer is delivered to the output of the multiplexer based on a control signal; and
   a controller that has a configuration that generates control signals with a collective configuration that causes the array of ultrasound transducer elements to steer or focus a beam of ultrasound energy;
   wherein the controller has a configuration that causes each multiplexer to deliver one of the ultrasound signals to its output only during a pre-determined time period, and
   wherein each multiplexer is controlled by the controller as a gate to emit a multi-cycle burst with a desired duration at a correct time.

2. The ultrasound beamformer of claim 1 wherein the controller has a configuration that controllably changes the collective configuration of the control signals so as to cause the array of ultrasound transducer elements to steer or focus a beam of ultrasound energy in different ways at different times.

3. The ultrasound beamformer of claim 1 wherein the number of signal inputs to each of the multiplexers is equal to the number of ultrasound signal transmitters.

4. The ultrasound beamformer of claim 1 wherein the controller has a configuration that causes at least two of the multiplexers to drive their respective ultrasound transducer element with the same ultrasound signal.

5. The ultrasound beamformer of claim 1 wherein the array of ultrasound transducer elements is one dimensional.

6. The ultrasound beamformer of claim 1 wherein the array of ultrasound transducer elements is two dimensional.

7. The ultrasound beamformer of claim 6 wherein the same multiplexer is used to drive at least two neighboring transducer elements.

8. The ultrasound beamformer of claim 1 wherein the controller has a configuration that generates the control signals with a collective configuration that causes the array of ultrasound transducer elements to steer and focus a beam of ultrasound energy.

9. The ultrasound beamformer of claim 1 wherein the frequency of the ultrasound signals are the same, but the phases are different.

10. The ultrasound beamformer of claim 8 wherein the phase differences are equally distributed over one cycle of the ultrasound signal.

11. The ultrasound beamformer of claim 10 wherein: there is an optimum time delay for each ultrasound signal
that is delivered to each ultrasound transducer element that causes the array of ultrasound transducer elements to collectively steer or focus a beam of ultrasound energy most effectively; and
the controller has a configuration that generates each control signal so as to cause the multiplexer that receives the control signal to select the ultrasound signal that has a delay that is closest to the optimum time delay for the ultrasound signal that is driven by the output of the multiplexer.

12. The ultrasound beamformer of claim 11 wherein:
each ultrasound signal has a number;
the controller has a configuration that generates each control signal in accordance with the following equation:

$$n = [N \bmod(t,T)/T]$$

where:
n is the number of the ultrasound signal that the control signal causes its associated multiplexer to select;
N is the number of inputs to the multiplexer that receives the control signal;
t is the optimum time delay for the ultrasound signal for the ultrasound transducer element that is driven by the multiplexer;
T is the period of the ultrasound signal;
[ ] indicate a rounding to the nearest integer; and
mod indicates a modulo operation.

13. The ultrasound beamformer of claim 1 wherein:
the number of ultrasound transducer elements is at least 16; and
the number of signal inputs to each of the multiplexers is in the range of 4 to 8.

14. The ultrasound beamformer of claim 13 wherein the number of signal inputs to each of the multiplexers is 4.

15. The ultrasound beamformer of claim 1 wherein:
at least one of the multiplexers has a configuration that does not deliver the signals at any of its signal inputs to its output when the control signal at its control input is of a particular type; and
the controller has a configuration that causes the control signal for that multiplexer to be of the particular type when causing the array of ultrasound transducer elements to steer or focus a beam of ultrasound energy in a particular way.

16. The ultrasound beamformer of claim 1 wherein the controller has a configuration that causes the control signal for each multiplexer to cause that multiplexer to deliver at least one of the ultrasound signals to its output when causing the array of ultrasound transducer elements to steer or focus a beam of ultrasound energy in a particular way.

17. The ultrasound beamformer of claim 1 wherein the controller has a configuration that causes each multiplexer to deliver one of the ultrasound signals to its output for only a pre-determined duration.

18. The ultrasound beamformer of claim 1 wherein the ultrasound signals are each square waves.

19. The ultrasound beamformer of claim 1 wherein the ultrasound signals are each sine waves.

20. The ultrasound beamformer of claim 1 wherein the controller has a configuration that controls the commencement and cessation of each output of each multiplexer and in a manner that is not the same for each multiplexer.

* * * * *

UNITED STATES PATENT AND TRADEMARK OFFICE
CERTIFICATE OF CORRECTION

| | | |
|---|---|---|
| PATENT NO. | : 10,269,340 B2 | Page 1 of 1 |
| APPLICATION NO. | : 14/408250 | |
| DATED | : April 23, 2019 | |
| INVENTOR(S) | : Jesse Yen | |

It is certified that error appears in the above-identified patent and that said Letters Patent is hereby corrected as shown below:

In the Specification

Column 1, Lines 21-24:
Please delete:
"This invention was made with government support under Grant No. R01CA116379-01A1, awarded by the National Institutes for Health. The government has certain rights in the invention."

And insert:
-- This invention was made with government support under R21 CA112174 awarded by the National Institutes of Health. The government has certain rights in the invention. --

Signed and Sealed this
Sixth Day of January, 2026

John A. Squires
*Director of the United States Patent and Trademark Office*